(12) United States Patent
Schilder et al.

(10) Patent No.: US 12,253,152 B2
(45) Date of Patent: Mar. 18, 2025

(54) ELECTRIC DRIVE DEVICE FOR A MOTOR VEHICLE, IN PARTICULAR FOR A MOTOR CAR

(71) Applicant: MERCEDES-BENZ GROUP AG, Stuttgart (DE)

(72) Inventors: Tobias Schilder, Ludwigsburg (DE); Carsten Gitt, Stuttgart (DE); Tobias Haerter, Stuttgart (DE); Jonathan Zeibig, Aalen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/724,332

(22) PCT Filed: Dec. 14, 2022

(86) PCT No.: PCT/EP2022/085947
§ 371 (c)(1),
(2) Date: Jun. 26, 2024

(87) PCT Pub. No.: WO2023/126183
PCT Pub. Date: Jul. 6, 2023

(65) Prior Publication Data
US 2025/0060029 A1 Feb. 20, 2025

(30) Foreign Application Priority Data
Jan. 3, 2022 (DE) .................... 10 2022 000 042.3

(51) Int. Cl.
*F16H 48/36* (2012.01)
*B60K 1/02* (2006.01)
(Continued)

(52) U.S. Cl.
CPC ............... *F16H 48/36* (2013.01); *B60K 1/02* (2013.01); *B60K 17/02* (2013.01); *B60K 17/165* (2013.01);
(Continued)

(58) Field of Classification Search
CPC ......... B60K 1/02; B60K 17/165; F16H 48/10; F16H 2048/364; F16H 2200/2007
See application file for complete search history.

(56) References Cited

U.S. PATENT DOCUMENTS

| 7,384,357 B2 | 6/2008 | Thomas et al. |
| 8,012,057 B2 | 9/2011 | Meixner |
| 10,300,905 B2 * | 5/2019 | Holmes ................... F16H 48/10 |

FOREIGN PATENT DOCUMENTS

| DE | 102004024086 A1 | 12/2005 | |
| DE | 102019209461 A1 * | 12/2020 | ............... B60K 1/00 |

(Continued)

OTHER PUBLICATIONS

Beck (Year: 2020).*
(Continued)

*Primary Examiner* — Derek D Knight
(74) *Attorney, Agent, or Firm* — PATENT PORTFOLIO BUILDERS PLLC

(57) ABSTRACT

An electric drive device includes a transmission with a first planetary gear set having a first element, a second element, and a third element. The transmission includes a second planetary gear set having a fourth element connected to the third element for conjoint rotation, a fifth element and a sixth element. A first output shaft is connected to the fifth element for conjoint rotation and a second output shaft is connected to the fourth element for conjoint rotation. A first electric machine has a first rotor that is or can be coupled to the sixth
(Continued)

Figure 1:
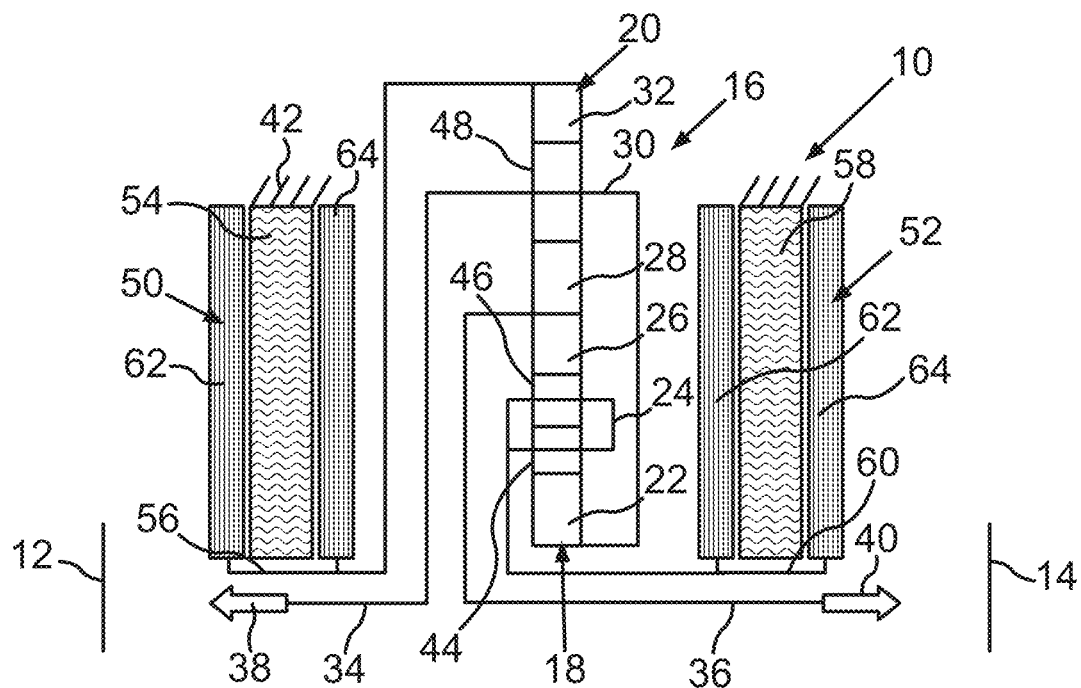

element such that torques provided by the first rotor can be introduced into the transmission via the sixth element.

10 Claims, 1 Drawing Sheet

(51) Int. Cl.
    *B60K 17/02*     (2006.01)
    *B60K 17/16*     (2006.01)
    *F16H 37/08*     (2006.01)
    *F16H 48/10*     (2012.01)
    *F16H 57/08*     (2006.01)

(52) U.S. Cl.
    CPC ......... *F16H 37/0806* (2013.01); *F16H 48/10* (2013.01); *F16H 57/082* (2013.01); *F16H 2048/104* (2013.01); *F16H 2048/106* (2013.01); *F16H 2048/364* (2013.01); *F16H 2200/0021* (2013.01); *F16H 2200/0034* (2013.01); *F16H 2200/201* (2013.01)

(56) References Cited

FOREIGN PATENT DOCUMENTS

EP     3348867 A1     7/2018
WO     2020259874 A1     12/2020

OTHER PUBLICATIONS

Belz; "Varianten von Mehrgang-Planetengetrieben;" Mar. 8, 2016; https://register.epo.org/application?documentId=EYPWMGE67270DSU&appnumber=EP13756488&showPdfPage=all.

International Search Report and Written Opinion mailed Mar. 22, 2023 in related/corresponding International Application No. PCT/EP2022/085947.

Office Action created Aug. 5, 2022 in related/corresponding DE Application No. 10 2022 000 042.3.

\* cited by examiner

ELECTRIC DRIVE DEVICE FOR A MOTOR VEHICLE, IN PARTICULAR FOR A MOTOR CAR

BACKGROUND AND SUMMARY OF THE INVENTION

Exemplary embodiments of the invention relate to an electric drive device for a motor vehicle, in particular for a motor car.

A torque distribution device comprising a torque distribution motor and a first sun gear is known from EP 3 348 867 A1. A plurality of first planetary gears are also provided, which are arranged on an outer peripheral side of the sun gear and engage in the sun gear.

The generic DE 10 2004 024 086 A1 discloses a drive device for a vehicle axle, comprising two electric machines, a differential gear and a superposition gear, by means of which the vehicle axle can be operated using torque vectoring.

Exemplary embodiments of the present invention are directed to an electric drive device for a motor vehicle, in particular for a motor car, thereby creating a particularly compact design of the drive device.

The invention relates to an electric drive device for a motor vehicle, in particular for a motor car. This means that, when fully assembled, the motor vehicle—which is preferably a motor car, in particular a passenger car, and is also referred to as a vehicle—has the electric drive device and can be driven electrically by means of the electric drive device, in particular purely electrically. Thus, the motor vehicle is preferably an electric vehicle, in particular battery-electric vehicle (BEV), or else a hybrid vehicle. In particular, when fully assembled, the motor vehicle has at least or exactly two vehicle axles, also referred to simply as axles, which are arranged one after the other, and thus one behind the other, in the longitudinal direction of the vehicle. The respective vehicle axle has, for example, at least or exactly two vehicle wheels, also referred to simply as wheels. The vehicle wheels of the respective vehicle axle are, for example, arranged on opposite sides of the motor vehicle to each other in the transverse direction of the vehicle. The vehicle wheels are ground contact elements, via which the motor vehicle is or can be supported downwards in the vertical direction of the vehicle on the ground. If the motor vehicle is driven along the ground while the motor vehicle is supported downwards on the ground in the vertical direction of the vehicle via the ground contact elements, the vehicle wheels roll, in particular directly, along the ground. The electric drive device is a constituent part of one, in particular exactly one, of the vehicle axles, so that the one vehicle axle has the electric drive device. The vehicle wheels of the one vehicle axle having the electric drive device can be driven electrically by means of the electric drive device, in particular purely electrically, whereby the motor vehicle as a whole can be driven electrically, in particular purely electrically. Where "vehicle wheels" are mentioned hereinafter, these are to be understood as the vehicle wheels of the one vehicle axle having the electric drive device that can be driven by means of the electric drive device, unless specified otherwise. One of the vehicle wheels is also referred to as first vehicle wheel, and the other vehicle wheel is also referred to as second vehicle wheel. The vehicle wheels are also referred to as drivable or driven vehicle wheels.

The electric drive device has a transmission, which has a first planetary gear set, a second planetary gear set, a first output shaft, and a second output shaft. In particular, the electric drive device has a housing in which the transmission can be at least partially arranged. The first planetary gear set is also referred to simply as first planetary set and has, for example, a first sun gear, a first planetary carrier, and a first ring gear. The first sun gear, the first ring gear, and the first planetary carrier, which is also referred to as a first link, are first transmission elements of the first planetary gear set. The second planetary gear set has, for example, a second sun gear, a second planetary carrier, which is also referred to as a second link, and a second ring gear. The second sun gear, the second planetary carrier, and the second ring gear are second transmission elements of the second planetary gear set or are also referred to as second transmission elements. The first transmission elements and the second transmission elements are also referred to as elements in summary. Thus, the first planetary gear set has a first one of the elements, a second one of the elements, and a third one of the elements, and the second planetary gear set has a fourth one of the elements, a fifth one of the elements, and a sixth one of the elements. In this case, the fourth element is connected to the third element, in particular permanently, for conjoint rotation. Particularly if the respective transmission element of the respective planetary gear set is not connected to the housing for conjoint rotation, the respective transmission element of the respective planetary gear set is able to rotate about a respective planetary gear set axis of rotation of the respective planetary gear set relative the housing. The planetary gear sets are arranged coaxially to one another, so that the planetary gear set axes of rotation coincide.

The first output shaft is connected, in particular permanently, to the fifth element for conjoint rotation. Torques, which are also referred to as first output torques, can be discharged from the transmission via the first output shaft. The second output shaft is connected, in particular permanently, to the fourth element for conjoint rotation, whereby torques, which are also referred to as second output torques, can be discharged from the transmission via the second output shaft. In particular, the respective output shaft is able to rotate about a respective output shaft axis of rotation relative to the housing. The output shafts are preferably arranged coaxially to one another, so that the output shafts axes of rotation coincide. Furthermore, in particular, the respective output shaft is arranged coaxially to the respective planetary gear set, so that the respective output shaft axis of rotation coincides with the respective planetary gear set axis of rotation.

The electric drive device also has a first electric machine, which has a first rotor. In particular, the first electric machine has, for example, a first stator. By way of example, the first rotor can be driven by means of the first stator and can be rotated thereby about a first machine axis of rotation relative to the first stator and also relative to the housing. In particular, the first electric machine can provide torques via its first rotor, which are also referred to as first drive torques.

The electric drive device also has a second electric machine, which has a second rotor. In particular, the second electric machine has a second stator. By way of example, the second rotor can be driven by means of the second stator and can be rotated thereby about a second machine axis of rotation relative to the second stator and also relative to the housing. The second electric machine can provide torques via its second rotor, which are also referred to as second drive torques. Thus, the first rotor can provide the first drive torques and the second rotor can provide the second drive torques. Furthermore, the transmission can provide the respective output torques via the output shafts.

The first rotor is or can be coupled, in particular in a torque-transmitting manner, to the sixth element such that the respective first drive torque provided by the first rotor can be introduced into the transmission via the sixth element. The second rotor is or can be coupled, in particular in a torque-transmitting manner, to the second element such that the respective second drive torque provided by the second rotor can be introduced into the transmission via the second element. In other words, the respective, first drive torque can be introduced, starting from the first rotor, into the transmission via the sixth element. Moreover, the respective, second drive torque can be introduced, starting from the second rotor, into the transmission via the second element. Thus, for example, the respective, first output torque results from the respective, first drive torque introduced into the transmission and/or from the respective, second drive torque introduced into the transmission. Furthermore, for example, the respective, second output torque results from the respective, first drive torque introduced into the transmission and/or from the respective, second drive torque introduced into the transmission. The first rotor can be coupled, in particular permanently, in a torque-transmitting manner to the sixth element coupled. Furthermore, the first rotor can be connected, i.e., coupled, in particular permanently, to the sixth element for conjoint rotation. It is also conceivable that the first rotor can be coupled, i.e., connected, in a torque-transmitting manner to the sixth element, in particular for conjoint rotation. The second rotor can be coupled, i.e., connected, in particular permanently, in a torque-transmitting manner to the second element. It is further conceivable that the second rotor is coupled, i.e., connected, in particular permanently, to the second element for conjoint rotation. In addition, it is possible that the second rotor can be coupled, i.e., connected, in a torque-transmitting manner to the second element, in particular for conjoint rotation.

In the context of the present disclosure, the feature that two components, such as the third element and the fourth element, are connected to one another for conjoint rotation is to be understood as meaning that components that are connected to one another for conjoint rotation are arranged coaxially to one another and, in particular when the components are driven, rotate jointly or simultaneously about a component axis of rotation common to the components, such as the first planetary gear set axis of rotation, at the same angular velocity, in particular relative to the housing. The feature that two components, such as the first rotor and the sixth element, are coupled or connected to one another in a torque-transmitting manner is to be understood as meaning that the components are coupled to one another such that torques can be transmitted between the components, whereby, when the components are connected to one another for conjoint rotation, the components are also connected to one another in a torque-transmitting manner.

The feature that components are permanently connected to one another in a torque-transmitting manner is to be understood as meaning that, rather than a switching element being provided that can be switched between a coupling state in which the components are connected to one another in a torque-transmitting manner and a decoupling state in which no torques can be transmitted between the components, instead the components are always or at all times and therefore permanently connected to one another in a torque-transmitting manner, i.e., in such a way that a torque can be transmitted between the components. Thus, for example, one of the components can be driven by the respective other component, and vice versa. In particular, the feature that the components are permanently connected to one another for conjoint rotation is to be understood as meaning that, rather than a switching element being provided that can be switched between a coupling state in which the components are connected to one another in a for conjoint rotation and a decoupling state in which the components are decoupled from one another and can rotate relative to one another, in particular about the component axis of rotation so that, for example, no torques can be transmitted between the components, instead the components are always or at all times, i.e., permanently, connected or coupled to one another for conjoint rotation. Thus, in the context of the present disclosure, a connection for conjoint rotation of two in particular rotatably mounted elements means that these two elements are arranged coaxially to one another and are connected to one another such that they rotate with the same angular velocity. Furthermore, the feature that two components can be coupled to one another in a torque-transmitting manner, in particular for conjoint rotation, is to be understood as meaning that the components are assigned a switching element that can be switched between a coupling state, in which the components are connected to one another in a torque-transmitting manner by means of the switching element, in particular for conjoint rotation, and a decoupling state, in which the components are decoupled from one another, so that the components can rotate relative to one another, in particular about the component axis of rotation, and so that in particular no torques can be transmitted between the components.

In order to realize a particularly compact overall design in particular in the axial direction of the transmission and thus in the axial direction of the electric drive device, it is provided according to the invention that the second planetary gear set is arranged axially overlapping and radially surrounding the first planetary gear set. The axial direction is understood as meaning that the axial direction runs parallel to the respective planetary gear set axis of rotation or coincides with the respective planetary gear set axis of rotation, so that viewed in the axial direction of the transmission and thus the electric drive device means viewed along the respective planetary gear set axis of rotation. The term "axial" thus means the axial direction of the transmission and thus of the electric drive device overall, since the axial direction of the transmission is the axial direction of the electric drive device and vice versa. The term "radial" means the radial direction of the transmission and thus of the electric drive device, with the radial direction of the transmission and thus of the electric drive device being perpendicular to the axial direction of the electric drive device or of the transmission. The two terms "axial" and "radial" thus refer in each case to the planetary gear set axis of rotation. Where the axial direction or "axial" is mentioned hereinafter, this is to be understood as meaning the axial direction of the transmission and thus of the electric drive device, unless specified otherwise. Where the radial direction or "radial" is mentioned hereinafter, this is to be understood as meaning the radial direction of the transmission and thus of the electric drive device, unless specified otherwise.

In particular, the feature that the second planetary gear set is arranged axially overlapping the first planetary gear set is to be understood as meaning that the planetary gear sets are at least partially arranged in the same axial area. As a result, a particularly short overall length of the electric drive device in the axial direction can be realized. The feature that the second planetary gear set is arranged radially overlapping the first planetary gear set is to be understood as meaning that the elements of the second planetary gear set are arranged in an area of larger radii in relation to the planetary gear set axis of rotation than the elements of the first planetary gear set.

Furthermore, the planetary gear sets form a particularly space-saving, four-shaft planetary set, which is also referred to as a four-shaft total planetary set.

In this case, for example, a first shaft of the four-shaft planetary set has the sixth element which is connected, in particular permanently, to a first input shaft of the four-shaft planetary set for conjoint rotation. In particular, the sixth element is a first input, also referred to as first drive, of the four-shaft planetary set, in particular of transmission as a whole, since the respective first drive torque can be introduced into the four-shaft planetary set, in particular the transmission, via the first input.

Furthermore, for example, a second shaft of the four-shaft planetary set has the second element that is connected for conjoint rotation, in particular permanently, to a second input shaft of the four-shaft planetary set for conjoint rotation. Furthermore, for example, the second element is a second input, also referred to as second drive, of the four-shaft planetary set, in particular of the transmission as a whole, since the respective second drive torque can be introduced into the four-shaft planetary set and thus into the transmission via the second input.

A third shaft of the four-shaft planetary set has, for example, the fifth element that is connected, in particular permanently, to the first output shaft for conjoint rotation. In particular, the fifth element is a first output, also referred to as first output drive, of the four-shaft planetary set, since the respective first output torque can be discharged from the four-shaft planetary set via the fifth element. The respective first output torque can be transmitted from the fifth element to the first output shaft and discharged from the transmission as a whole via the first output shaft.

By way of example, a fourth shaft of the four-shaft planetary set has the fourth element that is connected, in particular permanently, to the second output shaft for conjoint rotation. In particular, the fourth element is a second output, also referred to as second output drive, of the four-shaft planetary set since, for example, the respective second output torque can be removed from the four-shaft planetary set via the second output and can be transmitted in particular to the second output shaft, via which the respective second output torque can be removed from the transmission as a whole, i.e., discharged. In particular, the invention can be used to illustrate a possible modular kit, so that different construction variants of the electric drive device can be shown in a particularly simple manner.

Particularly advantageously, the transmission can be designed or function or be used as a torque distribution transmission. Torque distribution or torque splitting can be realized by means of the torque distribution transmissions, for example. Torque distribution is also referred to as torque vectoring or torque vectoring function. Torque distribution is to be understood as meaning that a respective torque that can be or has been introduced into the torque distribution transmission, such as the first drive torque and/or the second drive torque, can be split among or distributed to the vehicle wheels by means of the torque distribution transmission, as a result of which the vehicle wheels can be driven. By way of example, because of its mechanical design, the transmission has a basic distribution that is in particular unchangeable per se, i.e., cannot be varied, which is defined or predetermined in particular by the mechanical design of the torque distribution transmission. In accordance with the basic distribution, for example half of the respective drive torque introduced into the transmission can be applied or transmitted to the respective output shaft and thus to the respective vehicle wheel. It is in particular conceivable here that the torque distribution transmission or the basic transmission is influenced by means of one of the electric machines, in particular by introducing a respective torque into the torque distribution transmission, in such a way that the respective drive torque introduced into the torque distribution transmission is not applied or transmitted to the output shafts in accordance with the basic distribution, but rather in accordance with distribution deviating from the basic distribution, so that, for example, the first output torque and the second output torque, which result in particular from the fact that the first drive torque and the second drive torque are introduced into the transmission in particular simultaneously, are different from one another and can be varied, i.e., adjusted, as required in particular in the context of the torque vectoring function. It is furthermore conceivable that the transmission is a differential transmission or functions as a differential transmission and thus permits different speeds of the output shafts and thus of the vehicle wheels, for example when the motor vehicle is cornering, in particular in such a way that wheel on the outside of the bend and thus the output shaft driving the wheel on the outside of the bend rotates at a higher speed than the wheel on the inside of the bend and thus the output shaft driving the wheel on the inside of the bend. The torque vectoring function enables, for example, an unequal, i.e., not half, split of a torque introduced into the transmission across the output shafts, so that, for example, the wheel on the outside of the bend can be driven with a greater output torque than the wheel on the inside of the bend. Consequently, the motor vehicle can be accelerated particularly dynamically out of the bend, so that particularly good driving dynamics can be achieved.

It has been shown to be particularly advantageous if the first element is coupled, in particular permanently, to the fifth element for conjoint rotation, or if the first element can be coupled, i.e., can be connected, to the fifth element for conjoint rotation. As a result, a particularly advantageous drivability can be achieved in particularly compact design.

A further embodiment is characterized by a third planetary gear set, which is provided in particular in addition to the first planetary gear set and in addition to the second planetary gear set and which has, for example, a third sun gear, a third planetary carrier, also referred to as a third link, and a third ring gear. The third sun gear, the third planetary carrier, and the third ring gear are also referred to as third transmission elements of the third planetary gear set and are elements of the third planetary gear set. Thus, the third planetary gear set comprises a seventh one of the elements, an eighth one the elements and a ninth one of the elements. In this case, the seventh element is connected, in particular permanently, to the fourth element for conjoint rotation. Furthermore, the eighth element is connected, in particular permanently, to the fifth element for conjoint rotation. As a result, a particularly advantageous drive can be realized in a particularly space-saving manner. It is provided, in particular, that the third planetary gear set is arranged completely outside the first planetary gear set and the second planetary gear set in the axial direction and thus completely follows the first planetary gear set and the second planetary gear set. Particularly if the respective third transmission element is not connected to the housing for conjoint rotation, the respective third transmission element is, for example, able to rotate relative to the housing in particular about a third planetary gear set axis of rotation of the third planetary gear set. It is preferably provided in this case that the third planetary gear set is arranged coaxially to the first planetary gear set and coaxially to the second planetary gear set, so that the three planetary gear set axes of rotation coincide.

It is furthermore preferably provided that the third planetary gear set is provided coaxially to the first electric machine and/or coaxially to the second electric machine, so that the third planetary gear set axis of rotation coincides with the first and/or second machine axis of rotation.

It has been shown to be particularly advantageous if a first switching unit is provided that is designed to connect the first rotor to the ninth element for conjoint rotation. Thus, the first switching unit can be switched, for example, between a first coupled state and a first decoupled state. In the first coupled state, the first rotor is connected by means of the first switching unit to the ninth element for conjoint rotation. In the first decoupled state, the first switching unit permits the first rotor and the ninth element to rotate relative to each other, in particular about the third planetary gear set axis of rotation.

A further embodiment is characterized in that the electric drive device has a second switching unit that is designed to connect the first rotor to the sixth element for conjoint rotation. Thus, for example, the second switching unit can be switched between a second coupled state and a second decoupled state. In the second coupled state, the first rotor is connected by means of the second switching unit to the sixth element for conjoint rotation. In the second decoupled state, the second switching unit permits the first rotor and the sixth element to rotate relative to each other, in particular about the third planetary gear set axis of rotation. By way of example, the second decoupled state is activated or realized in the first coupled state. It is also conceivable that the first decoupled state exists, i.e., is set or realized, in the second coupled state. In other words, for example, the first coupled state goes hand in hand with the second decoupled state, and preferably the second coupled state goes hand in hand with the first decoupled state.

It has been shown to be particularly advantageous if the seventh element is the third sun gear, the eighth element is the third planetary carrier, and the ninth element is the third ring gear. It has been shown to be particularly advantageous shown if the eighth element, i.e., the third planetary carrier, is a double planetary carrier. This is understood to mean the following in particular: the third planetary gear set preferably has third planetary gears and fourth planetary gears. The third planetary gears and the fourth planetary gears are rotatably mounted on the third planetary carrier, i.e., on the double planetary carrier, in particular in such a way that the respective third planetary gear is able to rotate about a respective third planetary gear axis of rotation and the respective fourth planetary gear is able to rotate about a respective fourth planetary gear axis of rotation relative to the third planetary carrier. In this case, the third planetary gear set axes of rotation run parallel to one another, for example, and the third planetary gear set axes of rotation follow one another, for example, in the circumferential direction of the third planetary gear set that runs around the third planetary gear set axis of rotation. The same applies to the fourth planetary gear set axes of rotation, which for example run parallel to one another and are spaced apart from one another, in particular in such a way that the fourth planetary gear set axes of rotation follow one another in the circumferential direction of the third planetary gear set. The respective third planetary gear axis of rotation runs parallel to the respective fourth planetary gear axis of rotation, so that the third planetary gear set axes of rotation and the fourth planetary gear set axes of rotation follow one another, for example, in the circumferential direction of the third planetary gear set and are spaced apart from one another, in particular in pairs. By way of example, the respective third planetary gear meshes with the third sun gear, but not with the third ring gear. The respective fourth planetary gear meshes, for example, with the third ring gear, but not with the third sun gear. Furthermore, in each case one of the third planetary gears and one of the fourth planetary gears form a respective planetary gear pair, whereby the planetary gears of the respective planetary gear pair mesh with one another. As a result, a particularly advantageous drive of the motor vehicle can be realized in a particularly space-saving manner.

A further embodiment is characterized by a third switching unit that is designed to connect the first element to the fifth element for conjoint rotation. Thus, for example, the third switching unit can be switched between a third coupled state and a third decoupled state. In the third coupled state, the first element is connected by means of the third switching unit to the fifth element for conjoint rotation. In the third decoupled state, the third switching unit permits the first element and the fifth element to rotative relative to one another in particular about the third planetary gear set axis of rotation, so that the first element and the fifth element can rotate relative to one another in the third decoupled state in particular about the third planetary gear set axis of rotation.

In order to achieve a particularly compact and thus space-saving design of the electric drive device, it is provided in a further embodiment of the invention that the first electric machine, the third planetary gear set, the first planetary gear set, the third switching unit, and the second electric machine are arranged one after the other in the stated order as viewed in the axial direction of the transmission, i.e., are arranged one after another in the following order, i.e., in succession: the first electric machine—the third planetary gear set—the first planetary gear set—the third switching unit—the second electric machine. In other words, it is preferably provided that, in the axial direction of the electric drive device, the third planetary gear set follows the first electric machine, the first planetary gear set follows the third planetary gear set, the third switching unit follows the first planetary gear set, and the second electric machine follows the third switching unit.

In order to achieve a particularly advantageous drivability in a particularly space-saving manner, it is provided in a further embodiment of the invention that the third element is designed as a first sum shaft of the first planetary gear set, the fifth element is designed as a second sum shaft of the second planetary gear set, and the ninth element is designed as a third sum shaft of the third planetary gear set.

In a further, particularly advantageous embodiment of the invention, the first switching unit and the second switching unit are designed as a double switching unit, i.e., combined to form a double switching unit, wherein the double switching unit can be switched into at least two switching positions by means of exactly one actuator, i.e., by means of a single actuator. The drive device preferably also comprises the stated actuator. In a first of the switching positions, for example, the first coupled state and the second decoupled state are set, i.e., activated or switched on. In the second switching position, for example, the second coupled state and the first decoupled state are set, i.e., activated or switched on. By way of example, the switching unit can be moved, in particular in the axial direction and/or relative to the housing, by means of the actuator between the first switching position and the second switching position, in particular translationally and/or rotationally. This achieves advantageous switchability, so that a particularly effective and efficient operation can be achieved in a particularly space-saving manner. Because the double switching unit can be switched by means of the exactly one actuator in order to thereby be able to switch between the switching positions, the number of parts and thus the weight, the costs and the installation space can be kept particularly low.

A further embodiment is characterized in that the first element is the first sun gear, the second element is the first planetary carrier, and the third element is the first ring gear. It is also preferably provided that the fourth element is the second sun gear, the fifth element is the second planetary carrier, and the sixth element is the second ring gear. A particularly compact design can be achieved as a result.

Lastly, it has been shown to be particularly advantageous if the first planetary carrier is designed as a double planetary carrier. What has been stated hereinabove and in the following regarding the planetary carrier can also be applied to the first planetary carrier and vice versa. Thus, for example, the first planetary gear set has first planetary gears and fifth planetary gears, wherein the first planetary gears and the fifth planetary gears are rotatably held on the first planetary carrier, in particular in such a way that the respective first planetary gear is able to rotate about a respective first planetary gear axis of rotation and the respective fifth planetary gear is able to rotate about a respective fifth planetary gear axis of rotation relative to the first planetary carrier. The first planetary gear set axes of rotation run parallel to one another and are, in particular, spaced apart from one another and thus follow one another in the circumferential direction of the first planetary gear set that runs around the first planetary gear set axis of rotation. Accordingly, the fifth planetary gear set axes of rotation run parallel to one another, wherein the fifth planetary gear set axes of rotation are spaced apart from one another in the circumferential direction of the first planetary gear set, i.e., are arranged in succession. In this case, the first planetary gear set axes of rotation and the fifth planetary gear set axes of rotation are arranged in succession in the circumferential direction of the first planetary gear set and are spaced apart from one another, in particular as viewed in pairs. In particular, it is provided that the respective first planetary gear meshes with the first sun gear, but not with the first ring gear. The respective fifth planetary gear meshes, for example, with the first ring gear, but not with the first sun gear. In each case, one of the first planetary gears and one of the fifth planetary gears form a respective second planetary gear pair, with the respective planetary gears of the respective second planetary gear pair meshing with one another.

Very preferably, the second planetary carrier is designed as a single planetary carrier. This is to be understood in particular as meaning that the second planetary gear set has second planetary gears that are rotatably mounted on the second planetary carrier. In this case, the respective second planetary gear meshes with the second sun gear and, in particular simultaneously, with the second ring gear. As a result, a particularly compact design can be achieved.

Further advantages, features and details of the invention emerge from the following description of preferred exemplary embodiments and with reference to the drawing. The features and feature combinations mentioned above in the description and features and feature combinations mentioned hereinbelow in the description of the figures and/or shown alone in the figures, can be used not only in the respectively specified combination, but also in other combinations or in isolation, without departing from the scope of the invention.

BRIEF DESCRIPTION OF THE DRAWING FIGURES

Figure 2:
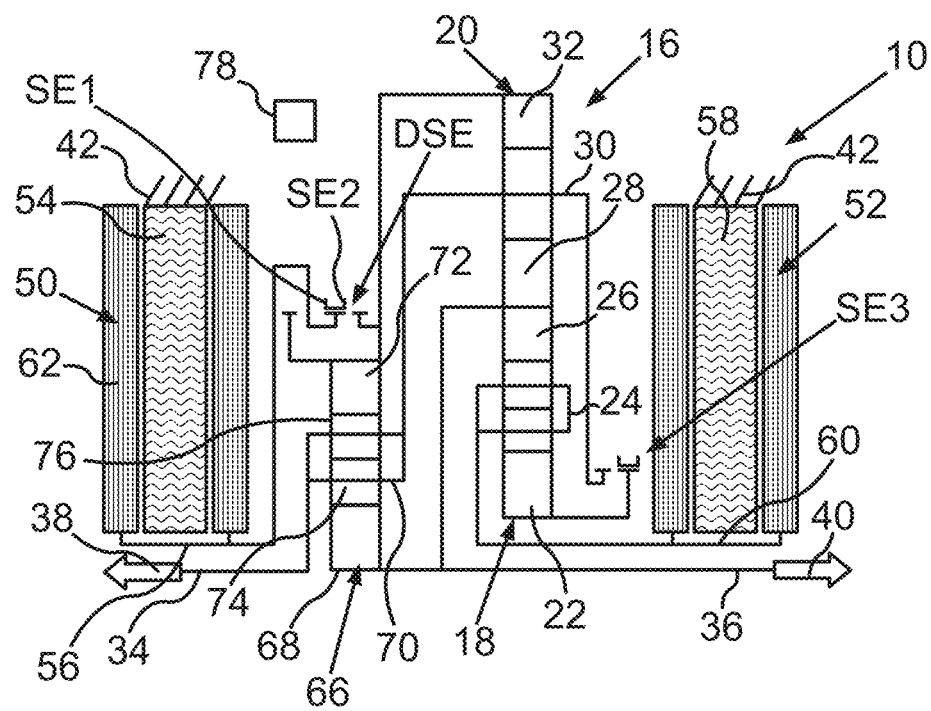

In the drawing:

FIG. 1 shows a schematic illustration of a first embodiment of an electric drive device for a motor vehicle; and FIG. 2 shows a schematic illustration of a second embodiment of the drive device.

Similar or functionally similar elements are provided with the same reference signs in the figures.

DETAILED DESCRIPTION

FIG. 1 shows in a schematic illustration a first embodiment of an electric drive device 10 for a motor vehicle, in particular for a motor car which is preferably a passenger car. When fully assembled, the motor vehicle, also referred to as vehicle, has at least or exactly two vehicle axles arranged in succession in the longitudinal direction of the vehicle and thus one behind the other. The respective vehicle axle has at least or exactly vehicle wheels, which are also referred to as wheels. The respective vehicle wheels of the respective vehicle axle are arranged opposite sides of the motor vehicle to each other in the transverse direction of the vehicle. At least or exactly one of the vehicle axles comprises the drive device 10, by means of which the vehicle wheels of the vehicle axles comprising the drive device 10 can be driven. The vehicle wheels that can be driven by means of the drive device 10, in particular purely electrically, are shown particularly schematically and are labelled 12 and 14 in FIG. 1.

The drive device 10 has a transmission 16, which has a first planetary gear set 18 and a second planetary gear set 20. The planetary gear set 18 has a first sun gear, a first planetary carrier, and a first ring gear. The planetary gear set 20 has a second sun gear, a second planetary carrier, and a second ring gear. The sun gears 22 and 28, the planetary carrier 24 and 30, and the ring gears 26 and 32 are also referred to as elements or are elements. In the exemplary embodiment shown in FIG. 1, the first sun gear is a first element 22 of the elements, the first planetary carrier is a second element 24 of the elements, the first ring gear is a third element 26 of the elements, the second sun gear is a fourth element 28 of the elements, the second planetary carrier is a fifth element 30 of the elements, and the second ring gear is a sixth element 32 of the elements. In the first embodiment, the fourth element 28 (second sun gear) is connected, in particular permanently, to the third element 26 (first ring gear) for conjoint rotation. The transmission 16 also has a first output shaft 34 and a second output shaft 36. As is illustrated by an arrow 38, torques, which are also referred to as first output torques, can be discharged from the transmission 16 via the output shaft 34, i.e., removed from the transmission 16. As is illustrated by an arrow 40, torques, which are also referred to as second output torques, can be removed or discharged from the transmission 16 via the output shaft 36. It can be seen that the fifth element 30 (second planetary carrier) is connected, in particular permanently, to the output shaft 34 for conjoint rotation. Moreover, the third element 26 and the fourth element 28 (first ring gear and second sun gear) are connected, in particular permanently, to the output shaft 36 for conjoint rotation.

The drive device 10 also has a housing 42 shown particularly schematically in FIG. 1. The first planetary gear set 18 is designed as a double planetary gear set. This means that the first planetary carrier (second element 24) is designed as a double planetary carrier. In this case, the planetary gear set 18 has first planetary gears 44 and fourth planetary gears 46. The planetary gears 44 and 46 are rotatably mounted on the first planetary carrier (second element 24) designed as a double planetary carrier, in particular in such a way that the respective planetary gear 44 meshes with the first sun gear, but not with the first ring gear. The respective planetary gear 46 meshes with the first ring gear, but now with the first sun gear. In addition, a respective one of the planetary gears 44 meshes with a respective one of the planetary gears 46. The planetary gear set 20 is designed as a single planetary gear set, so that the second planetary carrier (fifth element 30) is designed as a single planetary carrier. In this case, the planetary gear set 20 has second planetary gears 48 which are rotatably held on the planetary carrier 30 such that the respective planetary gear 48 meshes with the second sun gear and, in particular simultaneously, with the second ring gear.

The drive device 10 has a first electric machine 50 and a second electric machine 52. The first electric machine 50 has a first stator 54 and a first rotor 56, which can be driven by means of the stator 54. The electric machine 52 has a second stator 58 and a second rotor 60, which can be driven by means of the stator 58. Via its rotor 56, the electric machine can provide torques, which are also referred to as first drive torques, so that the rotor 56 can provide the respective first drive torque. Via its rotor 60, the electric machine 52 can provide torques, which are also referred to as second drive torques, so that the rotor 60 can provide the respective second drive torque. In the first embodiment, the respective electric machine 50, 52 is designed as an axial flux machine, i.e., as a disk-type machine. This means that the respective rotor 56, 60 has two for example at least substantially disk-shaped rotor parts 62 and 64, which are spaced apart from one another in the axial direction of the respective electric machine 50, 52 and thus in the axial direction of the transmission 16 and the drive device 10 as a whole. In this case, the respective stator 54, 58 is arranged in the axial direction of the respective electric machine 50, 52 between the respective rotor parts 62 and 64 of the respective electric machine 50, 52, in particular such that the respective rotor part 62 is overlapped or covered by the stator 54 at least partially, in particular at least predominantly or completely, in the axial direction of the respective machine 50, 52 in relation to the rotor part 64, and the respective rotor part 64 is overlapped or covered by the stator 54 at least partially, in particular at least predominantly or completely, in the axial direction of the respective electric machine 50, 52 towards the respective rotor part 62.

In particular, the respective rotor parts 62 and 64 are connected to one another, in particular permanently, for conjoint rotation, so that the rotor parts 62 and 64 are constituent parts of the respective rotor 56, 60.

The first rotor 56 is or can be coupled, i.e., is or can be connected, in particular in a torque-transmitting manner, to the sixth element 32 (second ring gear) such that the respective first drive torque that is or can be provided by the first rotor 56 can be introduced into the transmission 16 via the sixth element 32 (second ring gear). In the first embodiment, the rotor 56 is coupled, i.e., connected, in particular permanently, to the second ring gear (sixth element 32) for conjoint rotation. The second rotor 60 is or can be coupled, i.e., is or can be connected, in particular in a torque-transmitting manner, to the second element 24 (first planetary carrier) such that the respective second drive torque that is or can be provided by the second rotor 60 can be introduced into the transmission 16 via the second element 24 (first planetary carrier). In the first embodiment, the rotor 56 is coupled, i.e., connected, in particular permanently, to the first planetary carrier (second element 24) for conjoint rotation.

In order to realize a particularly compact design of the drive device 10, in particular in the axial direction of the transmission 16 and thus of the drive device 10, the second planetary gear set 20 is arranged axially overlapping and radially surrounding the first planetary gear set 18. In other words, the planetary gear sets 18 and 20 are stacked or nested, in particular one inside the other or on top of another, when viewed in the axial direction of the transmission 16 and thus of the drive device 10. Thus, at least one longitudinal region of the first planetary gear set 18 is completely overlapped or covered by the planetary gear set 20 in the circumferential direction of the planetary gear set 18 running around the axial direction of the transmission 16. In other words, the planetary gear set 20 surrounds at least the aforementioned longitudinal region of the planetary gear set 18, in particular completely circumferentially, in the circumferential direction of the transmission 16 and thus of the planetary gear set 18 running around the axial direction of the transmission 16. In the first embodiment, it is also provided that the first element 22 (first sun gear) is coupled, i.e., connected, in particular permanently, to the fifth element 30 (second planetary carrier) for conjoint rotation.

FIG. 2 shows a second embodiment of the electric drive device 10. The second embodiment is characterized by a third planetary gear set 66, which is provided in addition to the planetary gear sets 18 and 20. Moreover, the planetary gear set 66 is arranged in the axial direction of the drive device 10 and thus of the transmission 16 completely outside the planetary gear sets 18 and 20, i.e., not stacked with the planetary gear sets 18 and 20. The third planetary gear set 66 has a third sun gear, a third planetary carrier, and a third ring gear. The third sun gear, the third planetary carrier, and the third ring gear are also referred to as elements or are also elements. In the second embodiment, a seventh element 68 of the elements is thus the third sun gear, an eighth element 70 of the elements is the third planetary carrier, and a ninth element 72 of the elements is the third ring gear. In the second embodiment, the third planetary carrier is also designed as a double planetary carrier. In this case, the planetary gear set 66 has third planetary gears 74 and fifth planetary gears 76. The planetary gears 74 and 76 are rotatably mounted on the third planetary carrier designed as a double planetary carrier such that the respective planetary gear 74 meshes with the third sun gear, but not with the third ring gear. The respective planetary gear 76 meshes with the third ring gear, but not with the third sun gear. In each case, one of the planetary gears 74 and one of the planetary gears 76 form a respective second planetary gear pair, with the respective planetary gears of the respective second planetary gear pair meshing with one another. The fifth element 30 (second planetary carrier) is connected, in particular permanently, to the eighth element 70 (third planetary carrier) for conjoint rotation, with the output shaft 34 being connected, in particular permanently, to the eighth element 70 (third planetary carrier) for conjoint rotation. In addition, the seventh element 68 (third sun gear) is connected, in particular permanently, to the third element 26 (first ring gear) and thus to the fourth element 28 (second sun gear) for conjoint rotation. In addition, the output shaft 36 is thus connected, in particular permanently, to the seventh element 68 (third sun gear) for conjoint rotation.

A first switching element SE1 is provided in the second embodiment, by means of which the first rotor 56 can be connected to the ninth element 72 (third ring gear) for conjoint rotation. In particular, the planetary gear set 66 is provided in addition to the transmission 16 provided, i.e., it is not a constituent part of the transmission 16.

Furthermore, a second switching element SE2 is provided in the second embodiment, by means of which the first rotor 56 can be connected to the sixth element (ring gear 32) for conjoint rotation. The switching element SE1 is also referred to as first switching unit, and the switching element SE2 is also referred to as second switching unit. The switching element SE1 can be switched between a first coupled state and a first decoupled state. In particular, the switching element SE1 can be moved, in particular translationally, between a first coupled position that brings about the first coupled state and a first decoupled position that brings about the first decoupled state, in particular in the axial direction of the drive device 10 and/or relative to the housing 42. The switching element SE2 can be switched between a second coupled state and a second decoupled state. In particular, the switching element SE2 can be moved, in particular in the axial direction of the drive device 10 and/or relative to the housing 42 and/or translationally, between a second coupled position bringing about the second coupled state and a second decoupled position bringing about the second decoupled state. In the first coupled state, the rotor 56 is connected by means of the switching element SE1 to the third ring gear (ninth element 72) for conjoint rotation, in particular while the second ring gear (sixth element 32) can rotate relative to the rotor 56. In the second coupled state, the rotor 56 is connected by means of the switching element SE2 to the second ring gear (sixth element 32) for conjoint rotation, in particular while the third ring gear (ninth element 72) can rotate relative to the rotor 56. Thus, the first coupled state goes hand in hand with the second decoupled state or the first coupled position goes hand in hand with the second decoupled position, and the second coupled state goes hand in hand with the first decoupled state or the second coupled position goes hand in hand with the first decoupled position.

In the second embodiment, the switching elements SE1 and SE2 are brought together or combined to form a double switching unit DSE. The double switching unit DSE can be switched by means of a single actuator 78, shown particularly schematically in FIG. 2, of the drive device 10 between at least or exactly two switching states. In this case, the drive device 10 comprises the actuator 78. In particular, the double switching unit DSE can be moved by means of the actuator 78 between at least or exactly two switching positions, in particular in the axial direction of the drive device 10 and/or relative to the housing 42 and/or translationally. It can be seen that the switching elements SE1 and SE2 are parts of the double switching unit DSE and can be switched jointly or simultaneously with the double switching unit DSE. A first of the switching positions of the double switching unit DSE brings about a first of the switching states of the double switching unit DSE, and a second of the switching positions of the double switching unit DSE brings about a second of the switching states of the double switching unit DSE. In the first switching state, i.e., in the first switching position, the rotor 56 is connected by means of the double switching unit DSE and in this case by means of the switching element SE1 to the third ring gear (ninth element 72) for conjoint rotation. In the second switching state, i.e., in the second switching position, of the double switching unit DSE the rotor 56 is connected by means of the double switching unit DSE, in particular by means of the switching element SE2, to the second ring gear (sixth element 32) for conjoint rotation. Thus, the first switching state goes hand in hand with the first coupled position and with the second decoupled position, and the second switching state goes hand in hand with the second coupled position and the first decoupled position.

In the second embodiment, the electric drive device 10 moreover comprises a third switching element SE3, which is also referred to as third switching unit. The third switching unit SE3 is designed to connect the first element 22 (first sun gear) to the fifth element 30 (second planetary carrier) for conjoint rotation. The switching element SE3 can thus be switched between a third coupled state and a third decoupled state. In particular, the switching element SE3 can be moved between a third coupled position that brings about the third coupled state and a third decoupled position that brings about the third decoupled state, in particular translationally and/or in the radial direction of the drive device 10 and/or relative to the housing 42. In the third coupled state, the first sun gear (first element 22) is connected by means of the third switching element SE3 to the second planetary carrier (fifth element 30) for conjoint rotation. In the third decoupled state, the switching element SE3 releases the first sun gear (first element 22) for rotation relative to the second planetary carrier (fifth element 30), so that in the third decoupled state, the first sun gear (first element 22) can be rotated relative to the second planetary carrier (fifth element 30 or vice versa.

The switching element SE3 is an uncoupling element, which is also referred to as an uncoupling clutch or disconnect clutch. By means of the switching element SE3, in particular in the third decoupled state, the second electric machine 52 or its rotor 60 can be uncoupled from at least one part of the transmission 16, whereby a particularly advantageous single electric motor operation can be achieved. In the single electric motor operation, the output shafts 34 and 36 and thus the vehicle wheels 12 and 14 are driven in relation to the electric machine 50 and 52 only by means of the electric machine 50. The switching element SE3 is preferably in the third decoupled state, so that the second planetary carrier (fifth element 30) can rotate relative to the first sun gear (first element 22). As a result, the electric machine 52 or its rotor 60 is uncoupled from the transmission 16 such that the electric machine 50 or its rotor 56 does not drag the rotor 60 along with it via its transmission 16 in single electric motor operation. As a result, particularly efficient and thus low-energy operation can be realized.

It can furthermore be seen from FIG. 2 that, for example, the third planetary gear set 66 functions or is designed as a differential transmission, so that for example a planetary differential is represented by the planetary gear set 66. As a result, a particularly advantageous torque vectoring operation can be realized, which is also referred to as torque distribution or torque distribution operation.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCES 10 drive device
12 vehicle wheel
14 vehicle wheel
16 transmission
18 first planetary gear set
20 second planetary gear set
22 first element
24 second element
26 third element
28 fourth element
30 fifth element
32 sixth element
34 first output shaft
36 second output shaft
38 arrow
40 arrow
42 housing
44 first planetary gear
46 fourth planetary gear
48 second planetary gear
50 first electric machine
52 second electric machine
54 first stator
56 first rotor
58 second stator
60 second rotor
62 rotor part
64 rotor part
66 third planetary gear set
68 seventh element
70 eighth element
72 ninth element
74 third planetary gear
76 fifth planetary gear
78 actuator
DSE double switching unit
SE1 first switching element
SE2 second switching element
SE3 third switching element

The invention claimed is:

1. An electric drive device for a motor vehicle, the electric drive device comprising:
a transmission comprising
a first planetary gear set having a first element, a second element, and a third element;
a second planetary gear set having a fourth element connected to the third element to conjointly rotate, a fifth element, and a sixth element;
a first output shaft connected to the fifth element to conjointly rotate and via which torques are dischargeable from the transmission, and
a second output shaft connected to the fourth element to conjointly rotate and via which torques are dischargeable from the transmission,
a first electric machine having a first rotor coupled or couplable to the sixth element such that torques provided by the first rotor are introducible into the transmission via the sixth element; and
a second electric machine having a second rotor coupled to the second element such that torques provided by the second rotor are introducible into the transmission via the second element,
wherein the second planetary gear set is arranged axially overlapping and radially surrounding the first planetary gear set.

2. The electric drive device of claim 1, wherein the first element is coupled or couplable to the fifth element to conjointly rotate.

3. The electric drive device of claim 1, further comprising:
a third planetary gear set having a seventh element connected to the fourth element to conjointly rotate, an eighth element connected to the fifth element to conjointly rotate, and a ninth element;
a first switching unit configured to connect the first rotor to the ninth element to conjointly rotate; and
a second switching unit configured to connect the first rotor to the sixth element to conjointly rotate.

4. The electric drive device of claim 3, wherein the seventh element is a third sun gear, the eighth element is a third planetary carrier that is a double planetary carrier, and the ninth element is a third ring gear.

5. The electric drive device of claim 3, further comprising:
a third switching unit configured to connect the first element to the fifth element to conjointly rotate.

6. The electric drive device of claim 5, wherein the first electric machine, the third planetary gear set, the first planetary gear set, the third switching unit, and the second electric machine are arranged one after the other as viewed in an axial direction of the transmission in an order that follows, the first electric machine, the third planetary gear set, the first planetary gear set, the third switching unit, and the second electric machine.

7. The electric drive device of claim 3, wherein the third element is a first sum shaft of the first planetary gear set, the fifth element is a second sum shaft of the second planetary gear set, and the ninth element is a third sum shaft of the third planetary gear set.

8. The electric drive device of claim 3, wherein the first switching unit and the second switching unit are a double switching unit configured to switch into at least two switching positions by a single actuator.

9. The electric drive device of claim 1, wherein the first element is a first sun gear, the second element is a first planetary carrier, the third element is a first ring gear, the fourth element is a second sun gear, the fifth element is a second planetary carrier, and the sixth element is a second ring gear.

10. The electric drive of claim 9, wherein the first planetary carrier is a double planetary carrier and the second planetary carrier is a single planetary carrier.

* * * * *